(12) United States Patent
Hu et al.

(10) Patent No.: US 11,930,491 B2
(45) Date of Patent: Mar. 12, 2024

(54) RECONFIGURATION AND DEACTIVATION OR CANCELLATION OF NEW RADIO PRECONFIGURED UPLINK RESOURCES

(71) Applicant: Samsung Electronics Co., Ltd., Gyeonggi-do (KR)

(72) Inventors: Liang Hu, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 13 days.

(21) Appl. No.: 17/357,489

(22) Filed: Jun. 24, 2021

(65) Prior Publication Data

US 2022/0030605 A1    Jan. 27, 2022

Related U.S. Application Data

(60) Provisional application No. 63/056,931, filed on Jul. 27, 2020.

(51) Int. Cl.
*H04W 72/1268* (2023.01)
*H04L 5/00* (2006.01)
*H04W 72/21* (2023.01)

(52) U.S. Cl.
CPC ....... *H04W 72/1268* (2013.01); *H04L 5/0023* (2013.01); *H04W 72/21* (2023.01)

(58) Field of Classification Search
CPC .......... H04W 72/1268; H04W 72/0413; H04L 5/0023

(Continued)

(56) References Cited

U.S. PATENT DOCUMENTS 9,055,585 B2    6/2015   Lohr et al.
2018/0092125 A1*   3/2018   Sun .................. H04W 74/02
(Continued)

FOREIGN PATENT DOCUMENTS

CN    110831197    8/2018
GB    2580913    1/2019
(Continued)

OTHER PUBLICATIONS

European Search Report dated Dec. 17, 2021 issued in counterpart application No. 21187452.4-1205, 9 pages.

(Continued)

*Primary Examiner* — Chi Tang P Cheng
(74) *Attorney, Agent, or Firm* — The Farrell Law Firm, P.C.

(57) ABSTRACT

A user equipment (UE) apparatus for wireless communication with a base station is provided. The UE includes a transceiver and a processor. The processor is configured to transmit, to the base station, via the transceiver, at least one uplink (UL) data packet in a radio resource control (RRC) inactive state based on a preconfigured UL resource (PUR) configuration, wherein the PUR configuration is defined according to a set of PUR parameters, wherein the set of PUR parameters include at least one of a control resource set (CORESET) configuration including an aggregation level and repetition types; a physical UL shared channel (PUSCH) repetition configuration including a frequency hopping pattern; or a UL narrow beam direction for frequency range 2 (FR2) or a transmission reception point (TRP) association, and wherein the set of PUR parameters is associated with new radio (NR).

17 Claims, 11 Drawing Sheets

(58) Field of Classification Search
USPC ........................................................ 370/230
See application file for complete search history.

(56) References Cited

U.S. PATENT DOCUMENTS

| | | | |
|---|---|---|---|
| 2019/0020506 A1* | 1/2019 | Cheng | ................... H04L 1/1819 |
| 2020/0107396 A1* | 4/2020 | Wang | ................... H04W 72/23 |
| 2020/0245334 A1 | 7/2020 | Phuyal et al. | |
| 2020/0322981 A1* | 10/2020 | Choe | ..................... H04L 5/0094 |
| 2020/0350949 A1 | 11/2020 | Rico Alvarino et al. | |
| 2021/0014864 A1 | 1/2021 | Phuyal et al. | |
| 2021/0084694 A1* | 3/2021 | Selvaganapathy | .... H04W 76/27 |

FOREIGN PATENT DOCUMENTS

| | | |
|---|---|---|
| WO | WO 2015/113227 | 8/2015 |
| WO | WO 2020/034572 | 1/2019 |
| WO | WO 2020/032659 | 2/2020 |
| WO | WO 2020/034571 | 2/2020 |
| WO | WO-2020034571 A1 * | 2/2020 ............. H04L 5/001 |
| WO | WO 2020/065619 | 4/2020 |
| WO | WO 2020/093392 | 5/2020 |
| WO | WO 2020/165308 | 8/2020 |
| WO | WO 2020/166017 | 8/2020 |
| WO | WO 2020/166027 | 8/2020 |
| WO | WO 2020/193846 | 10/2020 |
| WO | WO 2020/199032 | 10/2020 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 15).
3rd Generation Partnership Project; Technical Specification Group Radio Access Network; NR; Physical layer procedures for control (Release 16).
3GPP TSG RAN Meeting #86 RP-200954, Sitges, Spain, Dec. 9-12, 2019, Work Item on NR smalldata transmissions in INACTIVE state.

* cited by examiner

RECONFIGURATION AND DEACTIVATION OR CANCELLATION OF NEW RADIO PRECONFIGURED UPLINK RESOURCES

PRIORITY

This application is based on and claims priority under 35 U.S.C. § 119(e) to U.S. Provisional Patent Application Ser. No. 63/056,931, filed on Jul. 27, 2020, the entire contents of which are incorporated herein by reference.

FIELD

The present disclosure is generally related to using pre-configured uplink resources for data transmission.

BACKGROUND

In some systems, especially in reduced capability new radio (NR) devices, there may be a large number of user equipment (UE) devices using preconfigured resources. For example, an industrial sensor or a video surveillance sensor may generate persistent (or semi-persistent) periodical uplink (UL) traffic using configured grant type 1 resources. Pre-configured resources from many reduced capability (RedCap) UEs may reduce the flexibility of the network to accommodate/multiplex for other UEs (e.g., enhanced mobile broadband (eMBB) users or ultra-reliable low latency communications (URLLC) users) at these preoccupied/preconfigured resources (e.g., control resource sets (CORESETs)/search space sets, semi-persistent scheduling (SPS) resources, or configured grant resources). Especially in frequency range 2 (FR2) (e.g., 24,250 megahertz (MHz)-52,600 MHz), pre-emption of the pre-configured resources may be complex and time consuming if the 2 UEs are using a fifth generation (5G) base station (gNB) with transmission or reception beams pointing in different directions.

Therefore, activation/deactivation and re-configuration of the pre-configured resources in a radio resource control (RRC)_INACTIVE state is essential to provide flexibility for scheduling other UEs, especially in congested scenarios. To optimize spectral efficiency and link level performance, new efficient mechanisms should be considered to adapt/update at least some of the NR pre-configured UL parameters, especially to combat changing radio conditions and traffic patterns.

SUMMARY

The present disclosure has been made to address the above-mentioned problems and disadvantages, and to provide at least the advantages described below.

In accordance with an aspect of the present disclosure, a UE for wireless communication with a base station is provided. The UE includes a transceiver and a processor. The processor is configured to transmit, to the base station, via the transceiver, at least one UL data packet in an RRC inactive state based on a preconfigured UL resource (PUR) configuration, wherein the PUR configuration is defined according to a set of PUR parameters, wherein the set of PUR parameters include at least one of a CORESET configuration including an aggregation level and repetition types; a physical UL shared channel (PUSCH) repetition configuration including a frequency hopping pattern; or a UL narrow beam direction for FR2 or a transmission reception point (TRP) association, and wherein the set of PUR parameters is associated with NR.

In accordance with another aspect of the present disclosure, a base station apparatus for wireless communication with a UE is provided. The base station apparatus includes a transceiver and a processor. The processor is configured to receive, from the UE, via the transceiver, at least one UL data packet in an RRC inactive state based on a PUR configuration, wherein the PUR configuration is defined according to a set of PUR parameters, wherein the set of PUR parameters include at least one of a CORESET configuration including an aggregation level and repetition types; a PUSCH repetition configuration including a frequency hopping pattern; or a UL narrow beam direction for FR2 or a TRP association, and wherein the set of PUR parameters is associated with NR.

In accordance with another aspect of the present disclosure, a UE for wireless communication with a base station is provided. The UE includes a transceiver and a processor. The processor is configured to receive, from the base station, via the transceiver, signaling information to reconfigure a PUR for transmitting at least one UL data packet to the base station in an RRC inactive state, wherein the PUR reconfiguration is defined according to a set of PUR parameters, wherein the set of PUR parameters include at least one of a resource allocation in a frequency, time or spatial domain, a CORESET configuration including an aggregation level and repetition types, a PUSCH repetition configuration including a frequency hopping pattern, a periodicity of the PUR, a modulation and coding scheme (MCS), a transport block size (TBS), a UL narrow beam direction for FR2 or a TRP association, an activation or deactivation of the PUR, a transmission power (Tx) adjustment, or a time alignment (TA), and wherein the set of PUR parameters is associated with NR.

In accordance with another aspect of the present disclosure, a base station apparatus for wireless communication with a UE is provided. The base station apparatus includes a transceiver and a processor. The processor is configured to transmit, to the UE, via the transceiver, signaling information to reconfigure a PUR for receiving at least one UL data packet from the UE in an RRC inactive state, wherein the PUR reconfiguration is defined according to a set of PUR parameters, wherein the set of PUR parameters include at least one of a resource allocation in a frequency, time or spatial domain, a CORESET configuration including an aggregation level and repetition types, a PUSCH repetition configuration including a frequency hopping pattern, a periodicity of the PUR, an MCS, a TBS, a UL narrow beam direction for FR2 or a TRP association, an activation or deactivation of the PUR, a Tx adjustment, or a TA.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
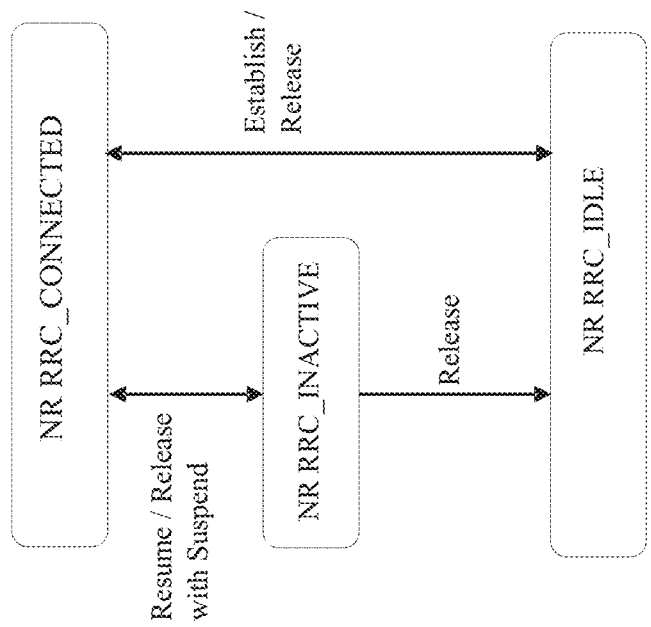
FIG. 1 illustrates NR RRC connection state transitions, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Many narrow band (NB)-Internet of things (IoT) applications involve transmission of infrequent small amounts of UL data, such as metering reports, alarms, or other types of information. Conventionally, this information may be inefficiently transmitted as UL data. For example, this UL data may have been transmitted when the UE is in an RRC_CONNECTED state, which requires a significant amount of battery power and/or bandwidth. However, since the amount of NB-IOT data is small, and transmission is infrequent, a new, more efficient solution of transmission is proposed.

FIG. 1 illustrates NR RRC connection state transitions, according to an embodiment.

Different RRC states use different amounts of resources, and therefore transitioning among RRC states is important to efficiently use network resources.

Referring to FIG. 1, three RRC states are shown: a NR RRC_CONNECTED state, a NR RRC_INACTIVE state, and a NR RRC_IDLE state.

When an NR UE is powered off, it is in a disconnected mode and is not in any of the three RRC states. Once the UE is powered on, it may first enter the RRC_IDLE state. In the RRC_IDLE state, the UE may attempt to establish a wireless connection with a base station (or other network node) and transition to the RRC_CONNECTED state. After it has transitioned, the UE may also be released from the RRC_CONNECTED state to resume the RRC_IDLE state.

However, after initially transitioning to the RRC_CONNECTED state, the UE may transition to the RRC_INACTIVE state to, for example, more efficiently use network resources. The RRC_INACTIVE state of the UE may be released, resumed, or suspended to transition back the RRC_CONNECTED state. Additionally, the UE may be released from the RRC_INACTIVE state and transition back to the RRC_IDLE state.

The RRC_INACTIVE state minimizes latency and reduces signaling load, thereby more efficiently using network resources and saving battery power of a UE when performing UL data transmissions.

Figure 2:
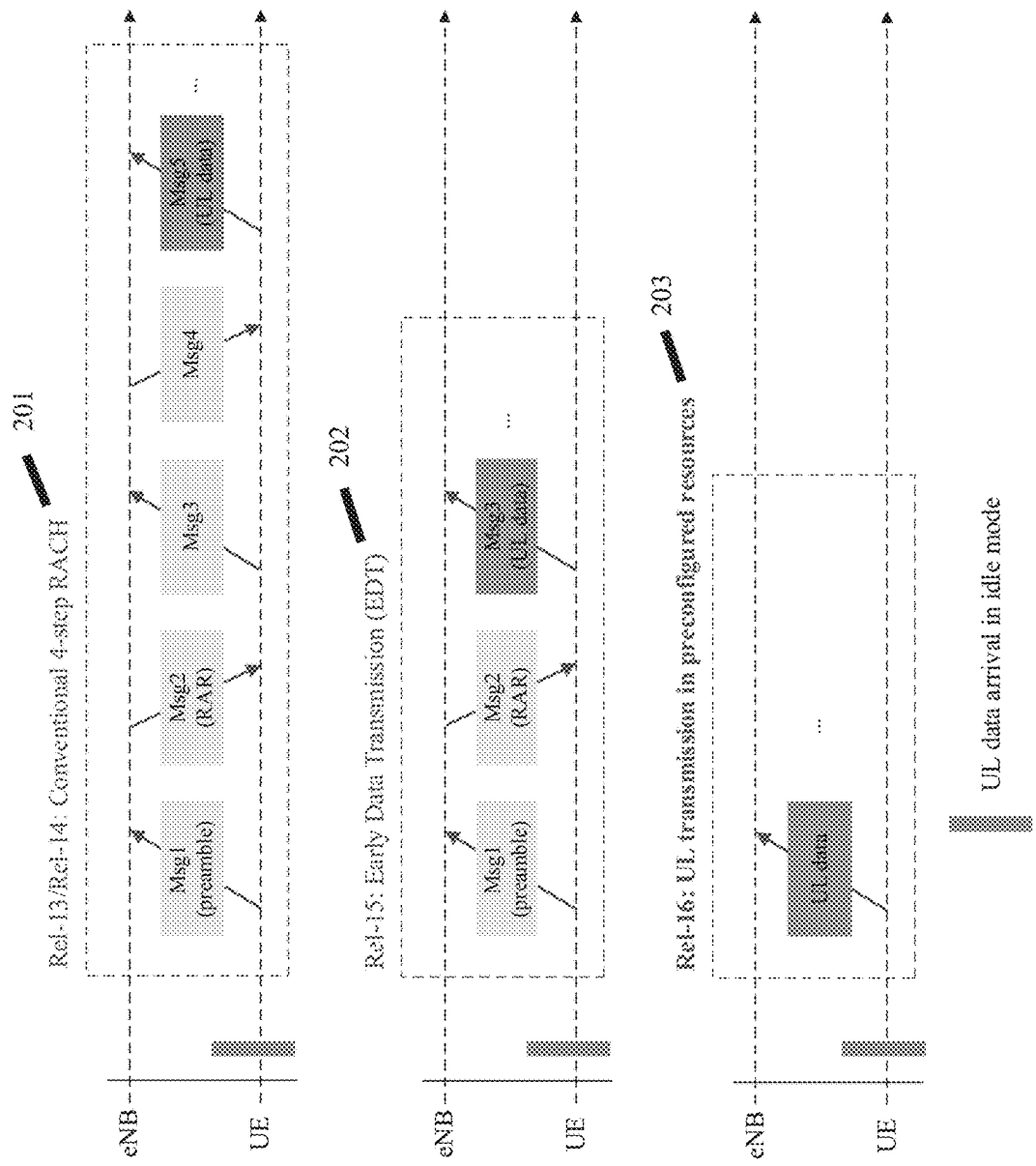
FIG. 2 illustrates UL data transmission procedures, according to an embodiment.

FIG. 2 illustrates UL data transmission procedures, according to an embodiment.

Referring to FIG. 2, a 4-step random access channel (RACH) transmission procedure 201 includes transmitting 4 messages (Msg1, Msg2, Msg3, and Msg4) prior to transmitting UL data to an eNB. This is a relatively inefficient manner of transmitting the UL data because UL data is transmitted after four messages have been transmitted.

Additionally, an early data transmission (EDT) method 202 includes transmitting 2 messages (Msg1 and Msg2) prior to transmitting UL data to an eNB. That is, in the EDT state (or mode), a UE may transmit UL data in message 3 (Msg3) and an eNB may transmit DL data in message 4 (Msg4) of the legacy 4-step RACH. This manner of transmitting the UL data is more efficient than the 4-step RACH transmission procedure 201.

In addition, the UE may continue to transmit UL or receive DL data transmissions in the EDT state after message 4 while in the RRC_IDLE or the RRC_INACTIVE state.

Similarly, a UE may transmit data in a RACH transmission state. In this case, data transmission may occur after the legacy RACH procedure.

A UL transmission of preconfigured resources 203 may be used to immediately transmit UL data to an eNB. This manner of transmitting UL data is more efficient than the transmission procedures 201 and 202. Rel-16 (e.g., UL transmission of preconfigured resources 203) was the first release that enabled UL data transfer in the RRC_INACTIVE state.

Accordingly, using transmission procedures 201-203, UL data packets may be sent with information periodically or sporadically.

The present application presents UL transmission features in addition to that which are provided in the REL-16 UL transmission 203, described above. As will be described below, NR PUR transmission parameters may be adjusted to more efficiently transmit UL data to better account for changing radio conditions and traffic patterns, thus providing the NR with improved functionality of UE transmissions of small data packets in the RRC_INACTIVE state.

Transmission using PUR

A PUR may be configured by upper layers for a UE in enhanced coverage, a bandwidth limited (BL) UE or a NB-IoT UE. When a PUR has been configured by upper layers, the following information may be provided in PUR-config, as specified in Section 5.4.7.1 of 3GPP TS 36.331:

PUR C-radio network temporary identifier (C-RNTI);
duration of PUR response window pur-ResponseWindowSize;
number pur-ImplicitReleaseAfter of skipped preconfigured UL grants before implicit release;
time alignment timer for PUR, pur-TimeAlignmentTimer, if configured.
periodicity of resources, pur-Periodicity; and
offset indicating PUR starting time, pur-StartTime.

In addition, it may also be possible to include other information or configurations with or in Pur-config, such as pur-NumOccasions, which may be counted in medium access control (MAC) or RRC.

Additionally, a MAC entity may sequentially consider that an Nth preconfigured UL grant may occur in the transmission time interval (TTI) based on pur-StartTime and (N * pur-Periodicity). Other calculations may also be possible to determine the Nth preconfigured UL grant.

When the PUR configuration is released by the upper layers, the MAC entity may discard the corresponding preconfigured UL grants. If the MAC entity has a PUR C-RNTI, the pur-TimeAligmentTimer may be configured, and with TA being valid as specified in TS 36.33, the MAC entity may be in RRC_IDLE for each TTI that has a running pur-TimeAlignmentTimer and a preconfigured UL grant. The preconfigured UL grant and associated hybrid automatic repeat request (HARQ) information may be delivered (e.g., transmitted) to a HARQ entity for each corresponding TTI.

After transmission using the preconfigured UL grant, the MAC entity may monitor a physical downlink control channel (PDCCH) identified by PUR C-RNTI in the PUR response window using timer pur-ResponseWindowTimer, which starts at the subframe that contains the end of the corresponding PUSCH transmission, plus 4 subframes and has the length pur-ResponseWindowSize. While pur-ResponseWindowTimer is running, the MAC entity shall:

if a UL grant has been received on PDCCH for PUR C-RNTI for retransmission, restart pur-Response Window Timer at the last subframe of a PUSCH transmission corresponding to the retransmission indicated by the UL grant, plus 4 subframes (also, it's possible that the window may or may not be restarted in this case);

if PDCCH indicates L1 acknowledgment (ACK) for PUR; or if PDCCH transmission is addressed to its PUR C-RNTI and the MAC packet data unit (PDU) is successfully decoded:
  stop pur-ResponseWindowTimer;
  consider (e.g., determine) transmission using PUR successful; and
  indicate to upper layers the PUR transmission was successful;

if PDCCH indicates fallback for PUR:
  stop pur-ResponseWindowTimer;
  consider (e.g., determine) transmission using PUR transmission has failed; and
  indicate to upper layers PUR fallback indication was received; and if the pur-ResponseWindowTimer expires:
  consider (e.g., determine) the preconfigured UL grant as skipped; and
  indicate to upper layers the PUR transmission has failed.

Additionally, a MAC entity may consider a preconfigured UL grant as skipped if no MAC PDU is generated based on Section 5.4.3.1 of 3GPP TS 36.331 for the preconfigured UL grant. The MAC entity may discard the preconfigured UL grants immediately after pur-ImplicitReleaseAfter number of consecutive skipped preconfigured UL grants in the RRC_IDLE state. The MAC entity may notify RRC to release the PUR configuration when the preconfigured UL grants are discarded.

PUR configuration may be defined as a configuration that contains all required information for dynamic PUR transmissions. The configuration may include the PUR search space configuration TA, time/frequency resource(s), repetition, MCS, TBS, period, time offset, hopping, RNTI, power control parameters, demodulation reference signal (DMRS) pattern, machine-type communications (MTC) physical downlink control channel (MPDCCH) frequency hopping configuration, and physical downlink shared channel (PDSCH) frequency hopping configuration.

PUR Allocation may be defined as a single time/frequency D-PUR resource allocation.

PUR SS Window may be defined as the time period associated with a PUR allocation where the UE monitors the MPDCCH.

For a dedicated PUR in an idle mode (e.g., in an RRC_IDLE state), the PUR search space configuration may be included in the PUR configuration. PUR search space may be the search space where the UE monitors for MPDCCH, and the PUR search space may be UE specific.

In an idle mode, the following PUR configurations and PUR parameters may be updated after a PUR transmission: timing advance adjustment; UE TX power adjustment; and repetition adjustment for PUSCH (both for coverage extension (CE) mode A and B).

The above update may be performed in an L1 downlink control indicator (DCI). Also, an L2 or L3 solution is optional.

Additionally, in the idle mode, the PUR search space configuration may include at least the following: MPDCCH narrowband location; MPDCCH repetitions and aggregation levels; MPDCCH starting subframe periodicity (variable G); or starting subframe position (alpha_offset).

The UE may monitor the MPDCCH for at least a time period after a PUR transmission.

For a dedicated PUR, during the PUR search space monitoring, the UE monitors for DCI scrambled with an RNTI assuming that the RNTI is not shared with any other UE.

The PUR configuration or PUR reconfiguration explicitly signals the CE mode which can only be changed via RRC signaling (i.e. not via L1 messages). The dedicated PUR ACK DCI allows, at least, for indicating, implicitly or explicitly, that the current PUR monitoring is terminated.

The repetition adjustment field in the PUR L1 ACK DCI may be signaled by a 2-bit field in CE Mode A that is interpreted as per legacy repetition number field; or a 3-bit field in CE Mode B that is interpreted as per legacy repetition number field.

In the dedicated PUR ACK DCI, the TA adjustment field may be 6 bits as legacy. The TA adjustment field may exist only when the dedicated PUR ACK DCI indicates successful decoding of PUR transmission.

Radio Layer 2 (RAN2) on downlink-PUR (D-PUR) may include the following procedural steps:

Valid TA may be a requirement in order to initiate D-PUR transmission.

The UE may use the D-PUR resource to send an RRC-ConnectionRequest or an RRCConnectionResumeRequest to establish or resume an RRC connection.

For the control plane (CP) solution, the UL data may be encapsulated as a non-access stratum (NAS) protocol data unit (PDU) in a UL RRC message transmitted in a common control channel (CCCH).

For the user plane (UP) solution, the UL data may be transmitted in a dedicated traffic channel (DTCH).

After the UL D-PUR transmission, the UE may monitor PDCCH under the control of a timer:

The timer may start after D-PUR transmission.

The timer may restart if a scheduling for D-PUR retransmission is received.

The UE may consider that the D-PUR transmission has failed if the timer expires.

The timer may stop when the D-PUR procedure ends/succeeds.

The downlink RRC response message, if needed, for the CP solution may include the following optional information:

downlink data encapsulated as an NAS PDU (downlink application layer response or pending data in a mobile management entity (MME)).

redirection information.

D-PUR configuration/re-configuration and release.

The downlink RRC response message for the UP solution may include the following optional information:

Resume ID.

Next hop (NH) parameter chaining counter (NCC) (mandatory)—the downlink RRC response message for the UP solution may always be provided.

redirection information.

D-PUR configuration/re-configuration and release.

The MAC control element (CE) for TA update can be sent along with the RRC transmission of the downlink RRC response message for the CP solution and UP solution.

After reception of D-PUR transmission, the eNB can move the UE to RRC connection by a RRCConnectionSetup message or a RRCConnectionResume message.

Fallback after D-PUR transmission is not successful is not necessarily specified (i.e. it is up to UE implementation to initiate legacy random access (RA), mobile originating (MO)-EDT or wait for next D-PUR occasion).

The PUR update request may only be performed in RRC_CONNECTED (i.e. not included with a PUR transmission). This replaces the previous agreement for UP regarding piggyback of PUR request with the PUR transmission.

In case the UE moves to RRC_CONNECTED, a new C-RNTI can be provided in RRC. If absent, the UE may maintain the PUR-RNTI as C-RNTI.

UE cannot be configured with more than one PUR configuration. Therefore, PUR config identity/index is not needed in PUR configuration.

If paging and PUR transmission opportunity collide, PUR transmission is prioritized.

LTE PUR Fallback

A UE can fallback from PUR to EDT or RACH based on a network indication or based on a UE's own initiative.

For example, for UEs using PUR that are supposed to be stationary or low mobility UEs, it might be possible to shorten the range of values used to update the TA (and hence reducing the number of bits) after a PUR transmission.

Beyond saving bits, a shortened TA update can be used as a way of controlling the distances a UE using PUR is allowed to move (i.e., if a large TA adjustment encompassing too many TA steps was needed, then that can hint that the UE has travelled a long distance since last TA adjustment, hence it is not a stationary or low mobility UE that is suitable to continue using PUR). If the (evolved node B) eNodeB determines that a TA adjustment will result in a large path loss change, then the eNodeB may indicate a fallback to legacy RACH/EDT since UEs requiring TA updates outside the shortened TA range are not suitable to remain using PUR resources.

Additionally, after data transmission on PUR, the UE may expect an explicit indication on MPDCCH for fallback to EDT or RACH. After data transmission on PUR, if nothing is received by the UE in a PUR search space window, the UE may fallback to a legacy RACH/EDT procedure.

For a dedicated PUR in idle mode, the indication to fallback to EDT or RACH may be included in the same DCI with PUR L1-ACK, and if the UE receives an indication to fallback to EDT or RACH, the PUR transmission may be considered not acknowledged.

If nothing is received by the UE during the PUR search space window after PUR retransmission(s), the UE may consider the PUR transmission is unsuccessfully received and may fallback to a legacy RACH/EDT procedure.

In addition, when "PUR fallback indication" is received, MAC may stop monitoring PDCCH in the PUR response window. Upon recognizing a PUR fallback indication from lower layers, MAC may indicate PUR fallback and PUR failure separately to the RRC.

NR Configured Grant Type 1

Figure 3A:
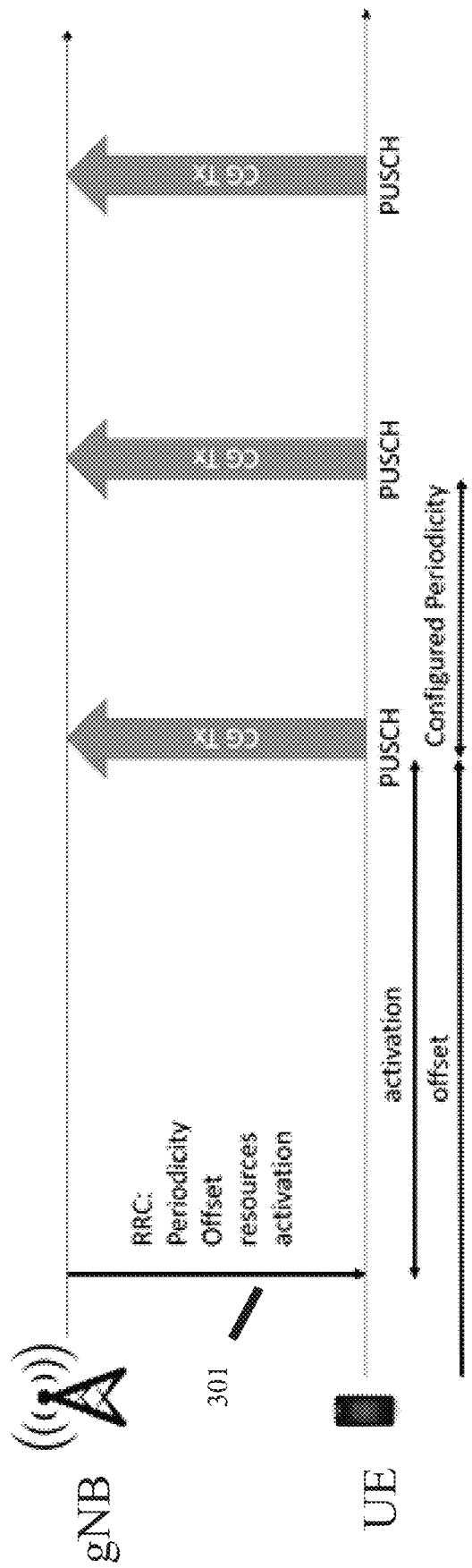
FIG. 3A illustrates an NR UL configured grant type 1, providing a UL grant by an RRC transmission, according to an embodiment.

FIG. 3A illustrates an NR UL configured grant type 1 providing a UL grant by an RRC transmission, according to an embodiment.

An NR configured grant type I may set all the transmission parameters, including periodicity, time offset, frequency resources, as well as an MCS of possible UL transmissions, using RRC signaling.

Referring to FIG. 3A, upon receiving the RRC configuration 301, the UE device can start to use the configured grant for PUSCH transmission in the time instant given by the periodicity and offset. The reason for the offset is to control what time instances the UE device is allowed to transmit information.

RRC configurations may take effect as soon as they are correctly received. The point in time in which transmissions are allowed (e.g., the configured periodicity) may vary, as it may depend on whether-radio link control (RLC) retransmissions were needed to deliver the RRC command or not. To avoid this ambiguity, a time offset relative to the system frame number may be included in the configuration.

In addition, configured grant type 1 parameters may also include a PUSCH repetition configuration including frequency hopping, a number of HARQ processes and a retransmission timer, and power control parameter.

NR Configured Grant Type 2

Figure 3B:
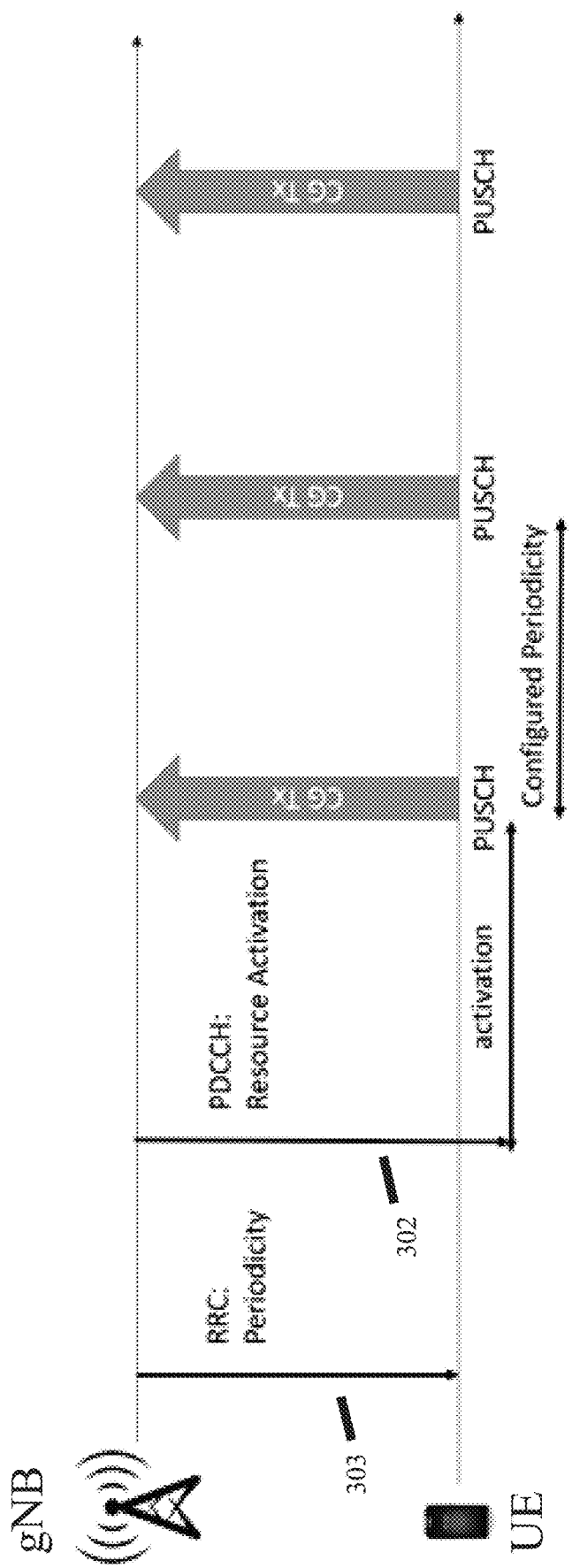
FIG. 3B illustrates an NR UL configured grant type 2, providing a UL grant by an RRC transmission, according to an embodiment.

FIG. 3B illustrates an NR UL configured grant type 2 providing a UL grant by an RRC transmission, according to an embodiment.

Referring to FIG. 3B, an NR UL configured grant type 2 may provide a UL using a PDCCH 302. Specifically, a transmission periodicity may be provided by RRC 303, and L1/L2 control signaling may be used to activate/deactivate the transmission in a similar way as in the downlink SPS. Upon receiving the activation command from the gNB, the UE device transmits, according to the preconfigured periodicity, if there is data in the buffer. If there is no data to transmit, the UE device will, similar to grant type 1, not transmit anything.

Additionally, no time offset may be needed if there is data in the buffer as, the activation time is well defined by the PDCCH transmission instant. The UE device may acknowledge the activation/deactivation of the configured grant type 2 by sending a MAC CE in the UL. If there is no data waiting for transmission when the activation is received, the network may not know if the absence of a transmission is due to an empty transmission buffer. Thus, the ACK may help in resolving this ambiguity.

NR Small Data Transmissions in an RRC_INACTIVE State

NR may support UEs with infrequent (periodic and/or non-periodic) data transmissions maintained by the network in the RRC_INACTIVE state. Until Rel-16, the RRC_INACTIVE state did not support data transmission. Hence, the UE had to resume the connection (i.e. move to the RRC_CONNECTED state) for any downlink mobile termination (MT) and UL mobile origination (MO) data. Connection setup and subsequent release to the RRC_INACTIVE state would happen for each data transmission, however small and infrequent the data packets are. This would result in unnecessary power consumption and signaling overhead.

Specific examples of small and infrequent data traffic may happen on smartphone applications (e.g., traffic from instant messaging services, traffic from heart-beat applications, traffic from email clients, push notifications, as well as information sent from other apps) and non-smartphone applications (e.g., traffic from wearables and video surveillance (e.g., periodic positioning information), sensors (e.g., industrial wireless sensor networks transmitting temperature or pressure readings, periodically or in an event triggered manner), and smart meters and smart meter networks sending periodic meter readings.

For example, the technical specifications of particular devices that may wirelessly communicate on the NR network are as follows:

Industrial wireless sensors: Reference use cases and requirements are described in TR 22.832 and TS 22.104. Communication service availability is 99.99% and end-to-end latency is less than 100 microseconds (ms). The reference bit rate is less than 2 megabits per second (Mbps) (potentially asymmetric e.g. UL heavy traffic) for all use cases and the device is stationary. The battery should last at least multiple years. For safety related sensors, the latency requirement is lower, 5-10 ms (TR 22.804).

Video Surveillance: As described in TR 22.804, a reference economic video bitrate would be 2-4 Mbps, with latency<500 ms, and reliability 99%-99.9%. High-end video e.g. for farming would require 7.5-25 Mbps. It is noted that traffic pattern is dominated by UL transmissions.

Wearables: A reference bitrate for smart wearable application can be 5-50 Mbps in downlink and 2-5 Mbps in UL. A peak bit rate of the device may be higher, up to 150 Mbps for downlink and up to 50 Mbps for UL. Battery of the device should last multiple days (up to 1-2 weeks).

Accordingly, as described in 3GPP TS 22.891, an NR system should be designed to be efficient and flexible for low throughput short data bursts, to support efficient signaling mechanisms (e.g. signaling should be less than a payload), and to generally reduce signaling overhead.

Signaling overhead in the RRC_INACTIVE state for UEs for small data packets is a general problem and will become a critical issue with more UEs in NR, not only for network performance and efficiency, but also for UE battery performance. In general, any device that has intermittent small data packets transmitted in the RRC_INACTIVE state will benefit from enabling small data transmission in the RRC_INACTIVE, as proposed in the present application.

The key enablers for small data transmission in NR, namely the RRC_INACTIVE state, 2-step RACH, 4-step RACH and configured grant type-1 are specified as part of Rel-15 and Rel-16. Accordingly, the solution proposed in the present application builds on these building blocks to enable small data transmission in an RRC_INACTIVE state for NR.

In the RRC_INACTIVE state, transmission of UL data on pre-configured PUSCH resources (e.g., reusing the configured grant type 1) may be used when TA is valid. Accordingly, as described herein, a general procedure for small data transmission over configured grant type 1 resources may be provided in the RRC_INACTIVE state using RAN2. Additionally, Grant type 1 resources may be configured for UL small data transmission in the RRC_INACTIVE state using RAN2.

Figure 4:
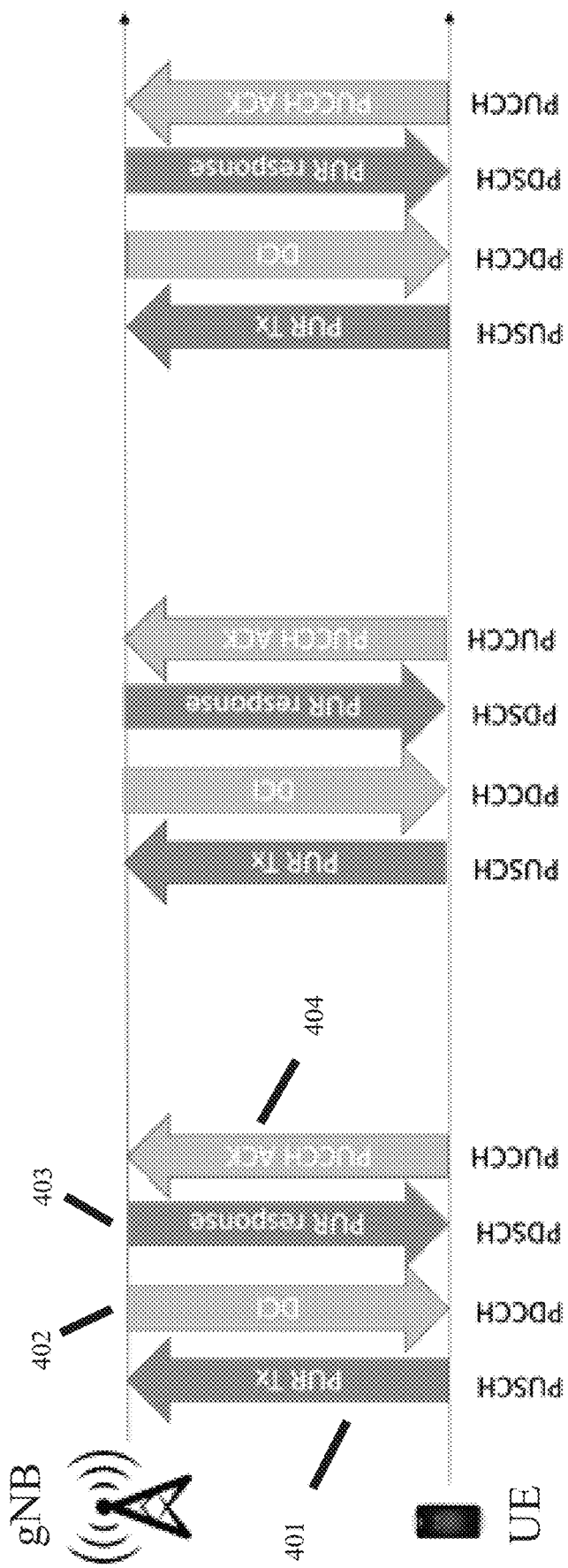
FIG. 4 is a layer 2 (L2)/layer 3 (L3) solution for NR PUR re-configuration, according to an embodiment.

FIG. 4 is an L2/L3 solution for NR PUR re-configuration, according to an embodiment.

Referring to FIG. 4, an L2/L3 solution for NR PUR transmission is proposed. Additionally, since LTE has a similar framework, this embodiment may or may not be applied to LTE, depending if content fields proposed in the present application are supported by both the NR and LTE framework.

An initial NR PUR configuration may include one resource allocation pattern in a frequency and time domain, one repetition and frequency hopping pattern, an MCS and/or TBS, one power control parameter, a beam direction, a UE specific PUR RNTI, and a TA. The parameters of the initial PUR can be re-configured for a UE based on the UE request, based on a radio network load, or based on a radio link performance.

For example, the UE can request to re-configure the PUR if the maximum TBS is smaller than the data to be transmitted, and the gNB may indicate an available PUR configuration among a set of possible TBS values. The UE request can be piggyback transmitted in the PUR payload in one PUR occasion (e.g., via a MAC CE). Additionally or alternatively, when the radio network load is high, the network can reconfigure the resource allocation pattern such that PUR occupies less resources than initially configured, or even deactivate some PURs.

The initial PUR configuration may include a RedCap UE specific CORESET configuration over which the UE monitors and decodes the DCI which may contain the position of the physical sidelink discovery channel (PSDCH) resources of a UE specific RRC signaling carrying the PUR re-configuration information which may include deactivation/activation of the PUR.

Alternatively, the initial PUR configuration may also include a common CORESET configuration over which the UE monitors and decodes the DCI which may contain the position of the PSDCH resources of new broadcast system information block RRC signaling carrying the PUR re-configuration information, which may include deactivation/activation of the PUR.

According to an embodiment, an initial PUR configuration may include a RedCap UE-specific and/or a common CORESET configuration over which the UE monitors and decodes the DCI for PUR re-configuration in an RRC_INACTIVE state.

For example, the CORESET configuration may include one or more of the following parameters:

controlResourceSetId: this corresponds to the L1 parameter "CORESET-ID". Value 0 identifies the common CORESET configured in master information block (MIB) and in ServingCellConfigCommon. Values 1 . . . maxNrofControlResourceSets-1 identify CORESETs configured by dedicated signaling. The controlResourceSetId is unique among the bandwidth parts (BWPs) of a ServingCell.

frequencyDomainResources: frequency domain resources defines the resource blocks within a BWP assigned to a UE. It corresponds to the L1 parameter "CORESET-freq-dom" with the following characteristics:

Each bit corresponds a group of 6 resource blocks (RBs), the grouping starts from physical resource block (PRB) 0, which is fully contained in the bandwidth part within which the CORESET is configure.

The most significant bit corresponds to the group of lowest frequency which is fully contained in the BWP within which the CORESET is configured, each next subsequent lower significance bit corresponds to the next lowest frequency group fully contained within the BWP within which the CORESET is configured, if any.

Bits corresponding to a group not fully contained within the BWP within which the CORESET is configured are set to zero.

duration: this corresponds to the L1 parameter "CORESET-time-duration", defining contiguous time duration in a number of symbols for CORESET.

cce-reg-MappingType: this provides a choice of mapping methods for a control channel element (CCE) to an RE group (REG).

reg-BundleSize: this corresponds to the L1 parameter "CORESET-REG-bundle-size" and provides a number of REGs within a REG Bundle.

interleave Size: This corresponds to the L1 parameter "CORESET-interleaver-size".

shiftIndex: this corresponds to CORESET-shift-index. If this parameter is absent, then the UE applies the value of physical cell ID configured for the serving cell.

precoderGranularity: this corresponds to the L1 parameter "CORESET-precoder-granuality". Precoder granularity is defined in a frequency domain.

tci-StatesPDCCH: this is a reference to a configured transmission configuration indicator (TCI) state providing quasi co-location (QCL) configuration/indication for PDCCH.

tci-PresentInDCI: this corresponds to the L1 parameter "TCI-PresentInDCI". This field indicates if the TCI field is present or not present in DL-related DCI.

pdcch-DMRS-ScramblingID: this is a PDCCH demodulation reference signal (DMRS) scrambling initialization parameter corresponding to the L1 parameter "PDCCH-DMRS-scrambling-ID." When the field is absent then the UE applies the value of the physical cell ID configured for the serving cell.

Referring again to FIG. 4, the RedCap UE may monitor DCI 402 after each or a certain number of PUR Tx 401 and then decode the PUR response in the form of a UE-specific RRC message or a broadcast new system information block.

The DCI 402 may include an ACK/negative acknowledgement (NACK) of the PUR Tx 401, as well as the UL grant for the HARQ re-transmission in case of a NACK. The ACK/NACK 404 and the UL grant for the HARQ re-transmission can be transmitted over a UE-specific or common search space. For decoding the PUR response message 403, the UE may also need to decode a UE specific or common search space if the PUR response message 403 is in UE-specific RRC signaling, or decode the common search space if the PUR response message 403 is in a new broadcast system information block.

Once the PUR is allocated to UEs, the configurations may be used for a period of time. However, the radio channel and UE traffic may vary all the time, so the configurations may not be suitable for the UE after a period of time. Accordingly, a reconfiguration mechanism may be considered for PUR. The reconfiguration can be done via a PUR response message 403.

The PUR response message 403 may include ACK/NACK of the PUR Tx 401 (if not included in DCI 402) and information to reconfigure at least one or more of the following parameters:

Resource allocation in a frequency domain, time domain, and/or spatial domain.
a CORESET configuration including the aggregation level and repetition types.
PUSCH repetition configurations including a frequency hopping pattern.
a Periodicity of PUR.
MCS and/or TBS.
a UL narrow beam direction (for FR2) and/or the TRP association.
Activation or deactivation of the PUR.
a Tx power adjustment.
TA updates.

Some or all of the aforementioned parameters may be used to configure PUR in 5G NR systems for a UE to perform data transmission in the RRC_INACTIVE state. For example, the following parameters may be used to control a PUR configuration in a 5G NR system but not in an LTE system:

a CORESET configuration including the aggregation level and repetition types.
PUSCH repetition configurations including a frequency hopping pattern.
a UL narrow beam direction (for FR2) and/or the TRP association.

Thus, using NR parameters to control a PUR configuration to achieve data transmission in an RRC_INACTIVE state advantageously provides PUR configurations that may not be possible in LTE or other prior legacy systems.

The PUR response can be UE specific RRC signaling or a new broadcast system information block. In case of a new broadcast system information block, the list of IDs of individual PURs to be re-configured may be included in the system information block i.e., the PUR RNTIs. For each PUR RNTI, a set of parameters to be updated may be included in the new system information block. The set of parameters may be, for example, PUR RNTI, TA update, Tx power adjustment, resource allocation, CORESET configuration, periodicity PUR, UL beam direction, or activation/deactivation. Each parameter may have one or more values assigned to it.

Resource allocation in a frequency/time domain or a spatial domain can be reconfigured based on how the UE traffic pattern (e.g., max TBS or periodicity) changes over time, thus a resource allocation in the frequency and time domain may adapt to it to improve spectral efficiency. Additionally or alternatively, resource allocation in the frequency/time domain or the spatial domain can be reconfigured based on pre-configured frequency/time/spatial domain resources that can be preempted for accommodating other high priority traffic in the cell.

The CORESET configuration (e.g., a CORESET configuration parameter) including the aggregation level and repetition types can be adapted to channel conditions to increase the capacity to allow more users to be scheduled by improving the efficiency of PDCCH usage. The capacity can be improved because the CCE utilization may be used more efficiently. For example, the gNB can use a UL reference signal received power (RSPR)/reference signal received quality (RSRQ) measurement or the UL transmission success rate to estimate the DL channel condition so as to determine the CORESET configuration in the DL. For an estimated good DL channel condition, the CORESET can be configured with a small aggregation level and or a small number of repetitions. For an estimated bad DL channel condition, the CORESET can be configured with a large aggregation level and or a large number of repetitions.

The repetition number and frequency hopping pattern (e.g., a PUSCH repetition parameter and/or frequency hopping parameter) are important parameters for RedCap UEs to compensate the coverage loss due to reduced Rx antennas or bandwidth, therefore the coverage compensation, enhancement level, and/or the channel quality, may be considered when selecting the repetition pattern (e.g., repetition type A or B), repetition number and frequency hopping pattern. For example, a larger repetition number may be re-configured when the channel quality (i.e., a received PUSCH channel quality at a gNB) gets worse. Additionally or alternatively, a frequency hopping pattern can be updated in terms of the specific BWP or a set of BWPs where a UE performs frequency hopping.

The periodicity of the occasions for PUR transmissions may be determined by both the traffic data properties (e.g., arrival rate and packet size) and the available resources for transmissions in PURs. Therefore, PUR periodicity may be repeatedly updated based on the latest traffic data properties and available resources in the cell.

The MCS and/or TBS may be updated by a gNB to maintain the link quality and maximize the spectrum efficiency.

According to an embodiment, UL beam direction (for FR2) and/or the TRP association (e.g., a UL narrow beam direction parameter and/or TRP association parameter) can be re-configured to recover from a beam failure in case the beam failure is detected by the gNB in the previous PUR transmission. According to another embodiment, when one beam in one TRP has too many UEs associated with it, some of these UEs can be re-associated to other neighboring TRPs using other beam directions to balance the load across TRPs and mitigate the interference among information pertaining to too many UEs being transmitted within the same beam.

The transmission power adjustment may be done by a gNB sending it in the RRC PUR response message. The set of Tx power adjustments may be based on open loop power control for each candidate UL beam.

Accordingly, the TA parameter may be updated when a UE is moving slowly.

According to an embodiment, it may be advantageous for a gNB to temporarily turn off transmission in PURs for RedCap UEs since the cell's traffic load may be relatively high. For example, the cell's traffic load status may change from the time when the PUR is configured. Although a dedicated PUR may be valid within a certain period, a gNB may prefer to take back and control the PUR for dynamic scheduling (e.g., the PUR may be de-activated). When the cell's traffic load is mitigated, transmission using the PUR can be turned on again, (e.g., the PUR may be activated). Since the cell's traffic load is not dependent on a certain UE, taking back a PUR (e.g., activating or re-activating a PUR) may be used for all UEs with a dedicated PUR provided by the cell. Therefore, the gNB can turn on or turn off the functionality of transmission using a PUR with UE-specific unicast signaling via a PUR response message, or broadcast signaling via new system information.

According to an embodiment, in order to efficiently send data packets in an RRC_INACTIVE state, a PUR can be reconfigured with the following parameters in an RRC UE-specific PUR response message, or a new broadcast system information block:

Resource allocation in a frequency domain, time domain, and/or spatial domain.
a CORESET configuration including the aggregation level and repetition types.
PUSCH repetition configurations including a frequency hopping pattern.
a Periodicity of PUR.
MCS and/or TBS.
a UL narrow beam direction (for FR2) and/or the TRP association.
Activation or deactivation of the PUR.
a Tx power adjustment.
TA updates.

Figure 5:
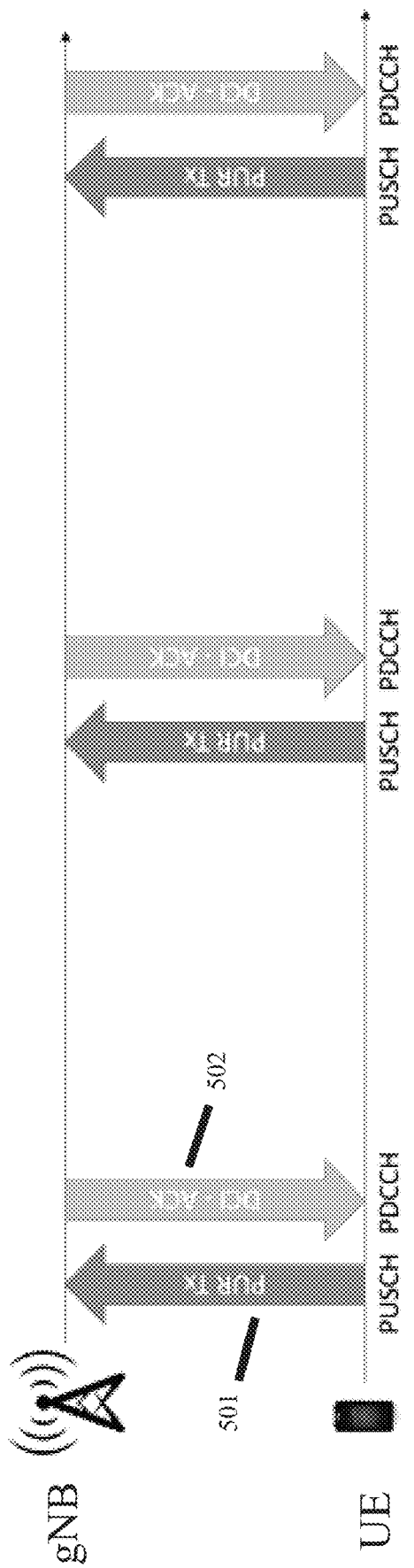
FIG. 5 is a layer 1 (L1) solution for NR PUR re-configuration, according to an embodiment.

FIG. 5 is an L1 solution for NR PUR re-configuration, according to an embodiment.

Referring to FIG. 5, a PUR Tx 501 may be transmitted from a UE to a gNB, and a DCI 502, transmitted from the gNB to the UE, may include an ACK/NACK and/or the UL grant for the HARQ re-transmission.

Additionally, the DCI 502 can include information to reconfigure some of the aforementioned PUR parameters. That is, the DCI 502 may include information to configure at least one of:

Resource allocation in a frequency domain, time domain, and/or spatial domain.
a CORESET configuration including the aggregation level and repetition types.
PUSCH repetition configurations including a frequency hopping pattern.
a Periodicity of PUR.
MCS and/or TBS.
a UL narrow beam direction (for FR2) and/or the TRP association.
Activation or deactivation of the PUR.
a Tx power adjustment.
TA updates.

Additionally, other parameters can also be reconfigured by L2/L3 UE-specific RRC signaling, or by broadcasting a new system information block. In this case, the DCI may also include a bit indicating the UE to monitor DCI for decoding RRC signaling in the corresponding PDSCH.

In this regard, information to reconfigure PUR parameters (e.g., signaling information) may take various forms. That is, information to reconfigure PUR parameters may be included in RRC signaling, PUR response messages, system information blocks, and/or DCI information.

Accordingly, according to an embodiment, data packets may be transmitted in the RRC_INACTIVE state based on preconfigured UL resources that can be updated and/or activated or deactivated in L1 DCI with the aforementioned parameters (e.g., a resource allocation in a frequency domain, time domain, and/or spatial domain; a CORESET configuration including the aggregation level and repetition types; PUSCH repetition configurations including a frequency hopping pattern; a periodicity of PUR; MCS and/or TBS; a UL narrow beam direction (for FR2) and/or the TRP association; activation or deactivation of the PUR; a Tx power adjustment; and/or TA updates).

In addition, once PURs are configured, they may be reserved for a period of time. If there are no data packet transmissions in the PURs, then it may be beneficial for the UEs to release the PUR(s) in order to improve the system's spectrum efficiency.

According to an embodiment, either no transmission or transmitting all "0"s for more than a number of continuous PURs can be used to indicate a PUR release.

Additionally, UL transmission failures may occur due to, for example, improper TA values, a low transmission power, deep channel fading, and/or beam failure. When failure occurs for the transmission in PURs, fallback may be necessary to save power, reduce packets loss and avoid interference with other UEs due to UL asynchrony.

Generally, the traffic package size for transmission in PURs is small, and it may be better for the UEs to use EDT when the transmission in PURs fails. However, if a large number of UEs use EDT, the transmission failure of EDT increases (e.g., EDT is contention-based). Similarly, if a large number of UEs use RACH, then RACH failure may also increase.

Therefore, according to an embodiment, gNBs can indicate UEs to fallback to RACH or EDT in order to avoid increasing collisions of EDT or RACH.

For example, gNBs may indicate UEs to fallback to RACH or EDT based on the UE activity in EDT and RACH. The fallback indication can be designed together with the PUR deactivation/release mechanism. For example, the PUR deactivation/release can also be used to indicate a fallback.

In principle, the UE should fallback right away after receiving this fallback indication, so that it is an NW controlled fallback. After fallback in EDT, the UE can receive a PUR (activate) message again when the NW chooses to do so (i.e., after EDT, the UE keeps monitoring the PUR search space for a PUR (activate) message), or the UE can receive the notification to do RACH.

Thus, the NW can flexibly re-configure the NR UE in PUR, EDT and RACH modes depending on the UE traffic pattern and NW conditions.

In addition, when PUR is released and the UE is in EDT, the UE may need to be in RRC_CONNECTED state to be able to receive a new PUR configuration.

However, according to an embodiment, the UE may receive a new PUR configuration in message 4 of EDT (e.g., a message indicating to resume a previous PUR configuration), without going to the RRC_CONNECTED state.

Additionally, UL resources may be cancelled via an enhanced UL cancellation indication (CI) transmitted over the DCI.

Figure 6:
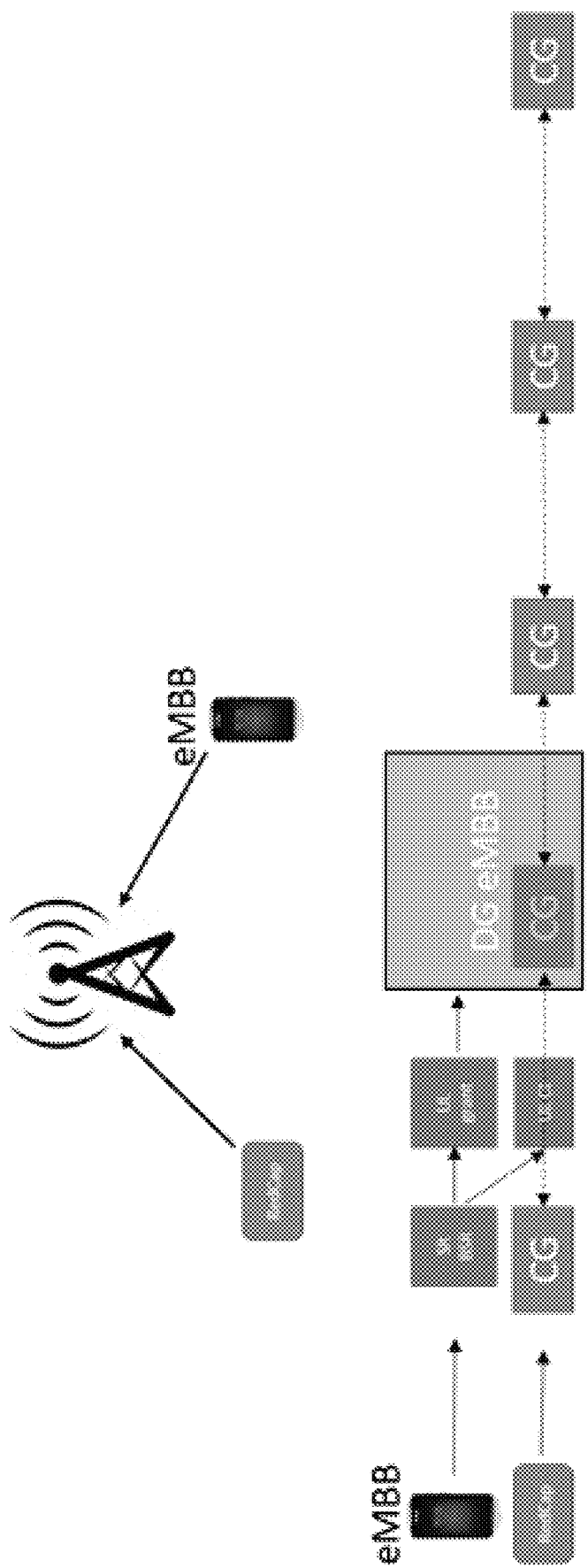
FIG. 6 illustrates a scenario in which RedCap UEs are in half duplex (HD)-frequency division duplex (FDD) or time-division duplex (TDD) in frequency range 1 (FR1) (e.g., 410 MHz-7,125 MHz), and coexist with eMBB traffic, according to an embodiment.
Figure 7:
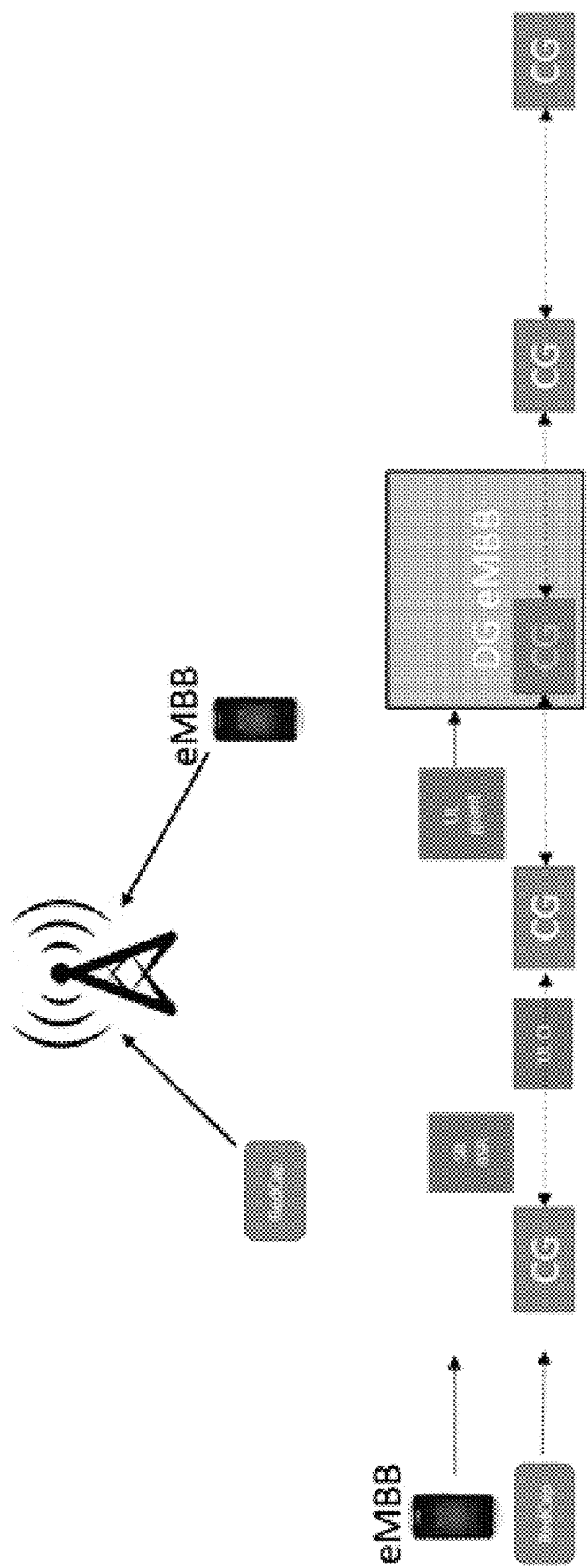
FIG. 7 illustrates a scenario in which RedCap UEs are in TDD in FR2, and coexist with eMBB traffic, according to an embodiment.

FIG. 6 illustrates a scenario in which RedCap UEs are in HD-FDD or TDD in FR1, and coexist with eMBB traffic, according to an embodiment. FIG. 7 illustrates a scenario in which RedCap UEs are in TDD in FR2, and coexist with eMBB traffic, according to an embodiment.

For each of the scenarios shown in FIGS. 6-7, after the ongoing configured grant PUR Tx, a RedCap UE in an RRC_inactive state can monitor for an enhanced UL CI transmitted over the DCI and cancel some of the RedCap UEs future PUR resources and/or re-schedule new UL resources for RedCap UEs for better multiplexing other eMBB traffic.

Figure 8:
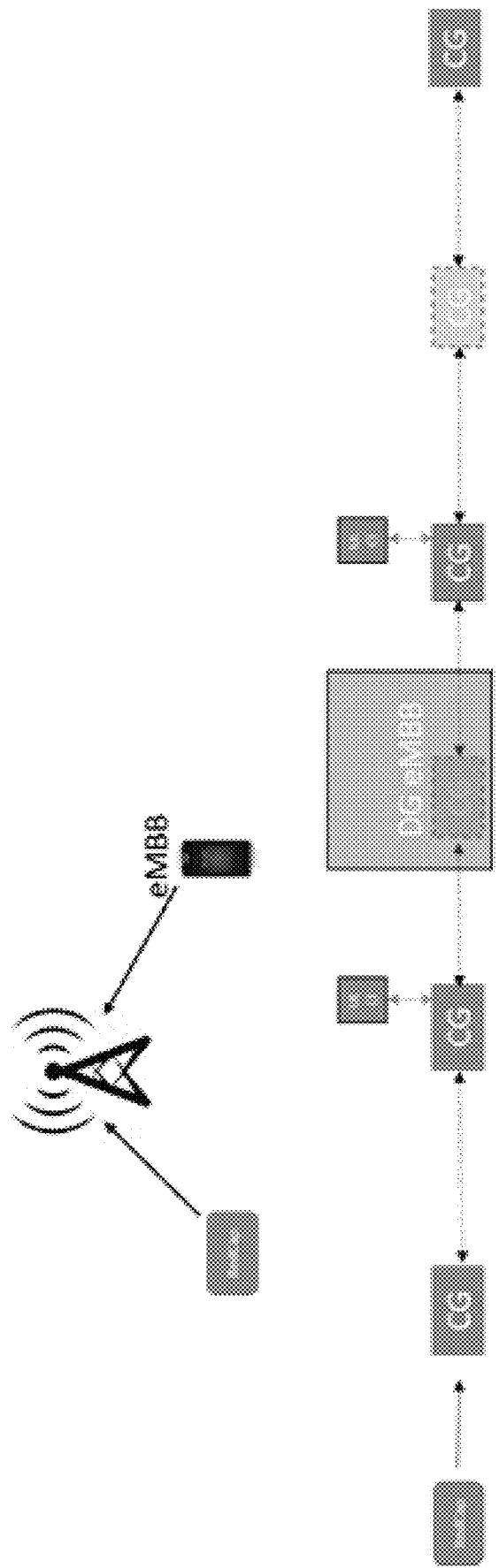
FIG. 8 illustrates a scenario in which RedCap UEs are in HD-FDD or TDD in FR1, and coexist with eMBB traffic, according to an embodiment.

FIG. 8 illustrates a scenario in which RedCap UEs are in HD-FDD or TDD in FR1, and coexist with eMBB traffic, according to an embodiment.

Referring to FIG. 8, in the case in which RedCap UEs are in HD-FDD or TDD in FR1 and coexist with eMBB traffic, a RedCap UE may be introduced to proactively send a UL CI using the configured grant/PUR resource to gNB to cancel some of the RedCap UEs' pre-configured reserved future UL resources to improve spectrum efficiency in case there is no upcoming RedCap UE traffic.

Figure 9:
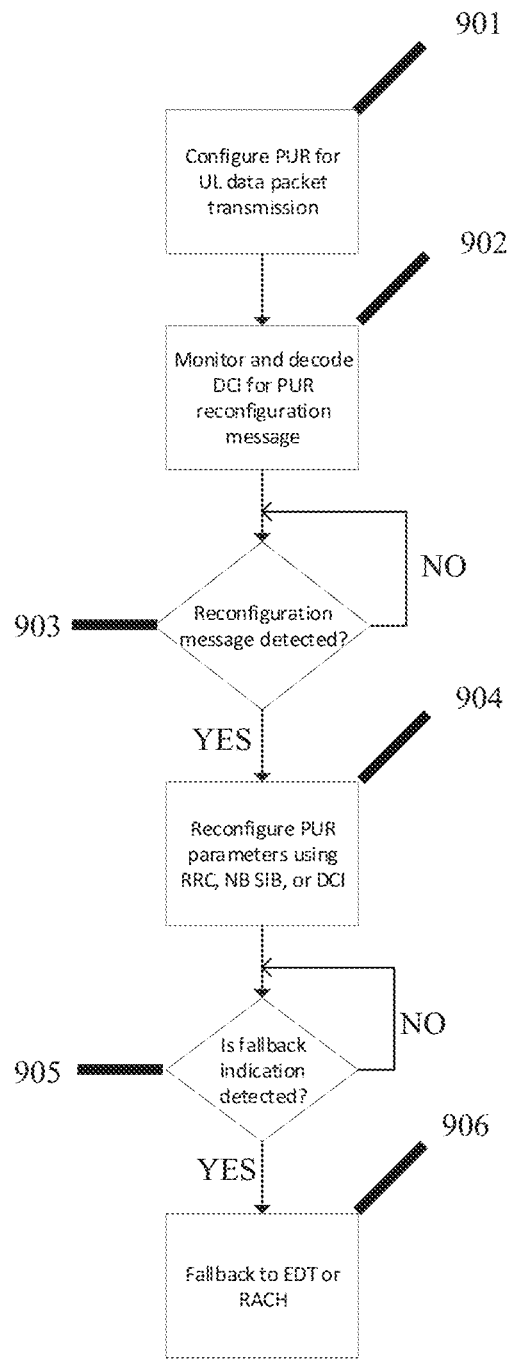
FIG. 9 is a flowchart illustrating a method of configuring a PUR for UL data transmission, according to an embodiment.

FIG. 9 is a flowchart illustrating a method of configuring a PUR for UL data transmission, according to an embodiment.

Referring to FIG. 9, in step 901, a PUR is configured for UL data packet transmission. In this case, parameters associated with a PUR transmission may be configured to enable a data packet to be transmitted in an RRC inactive state.

In step 902, DCI for PUR reconfiguration is monitored and decoded in the RRC inactive state. For example, the UE may monitor for and decode DCI transmitted from a base station, or another network node, to detect a PUR reconfiguration message.

In step 903, it is determined whether the PUR reconfiguration message is detected. If the PUR reconfiguration message is detected, then in step 904, PUR parameters may be reconfigured based on RRC signaling, an NB system information block, or DCI.

In step 905, it is determined whether a fallback indication is detected. A fallback indication may be any signal that indicates a fallback. For example, the fallback indication may be an indication that is autonomously detected by the UE, such as detection of beam failure or a TA not being valid. In step 906, if a fallback indication is detected then the connection state falls back to an EDT or RACH state.

In the EDT or RACH state, small data transmission (SDT) may still occur periodically or periodically.

Additionally, even after falling back to a RACH state, the base station may indicate, to the UE, to change from a RACH-based SDT to a configured grant-based SDT.

In addition, some the steps shown in FIG. 9 may be omitted, or performed in an order that is different from what is illustrated in FIG. 9, so long as each step accomplishes the function that it performs, then the embodiment shown in FIG. 9 may be realized.

Figure 10:
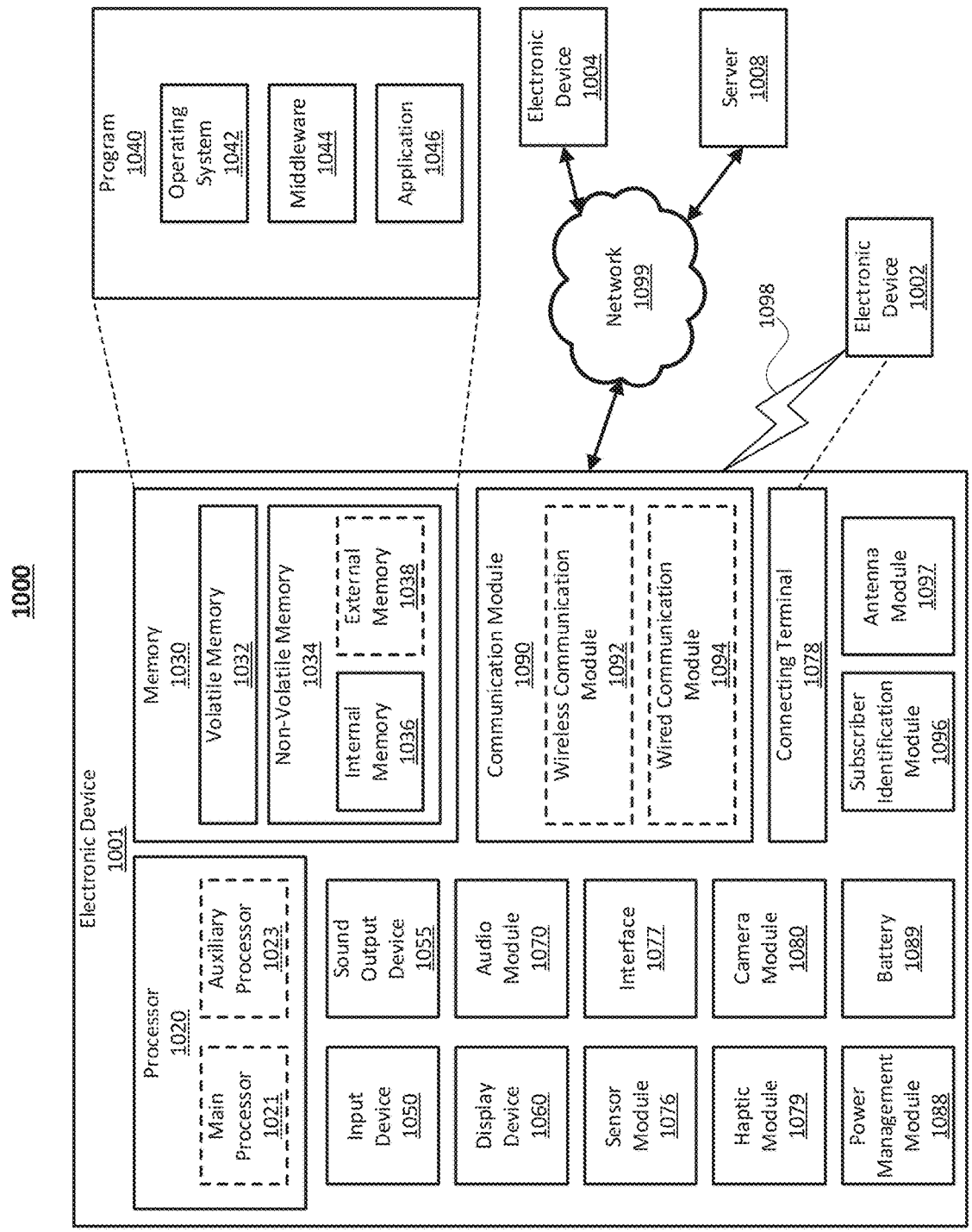
FIG. 10 illustrates an electronic device in a network environment, according to an embodiment.

FIG. 10 illustrates an electronic device in a network environment, according to an embodiment.

Referring to FIG. 6, the electronic device 1001, e.g., a mobile terminal including GPS functionality, in the network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097 including a GNSS antenna. In one embodiment, at least one (e.g., the display device 1060 or the camera module 1080) of the components may be omitted from the electronic device 1001, or one or more other components may be added to the electronic device 1001. In one embodiment, some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor, and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to one embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to one embodiment, the audio module 1070 may obtain the sound via the input device 1050, or output the sound via the sound output device 1055 or a headphone of an external electronic device 1002 directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wiredly) or wirelessly. According to one embodiment, the interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. According to one embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. According to one embodiment, the haptic module 1079 may include, for example, a motor, a piezoelectric element, or an electrical stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. According to one embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor) and supports a direct (e.g., wired) communication or a wireless communication. According to one embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to one embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general-purpose input and output (GPIO), a serial peripheral interface (SPI), or a mobile industry processor interface (MIPI)).

According to one embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Accordingly, the present application provides NR with a new functionality of UE transmitting small data in an RRC inactive state using PUR. That is, the present application provides a solution for building on configured grant Type 1 to enable small data transmission in an RRC_inactive state for NR.

Additionally, the present application provides a solution for enabling a UE to release a PUR and/or to enable a UE fallback and continue SDT.

In addition, the present application provides an UL solution for cancelling and/or rescheduling PURs for RedCap UEs.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A user equipment (UE) apparatus for wireless communication with a base station, the UE apparatus comprising:
   a transceiver; and
   a processor configured to:
      transmit, to the base station, via the transceiver, at least one uplink (UL) data packet in a radio resource control (RRC) inactive state based on a preconfigured UL resource (PUR) configuration, wherein the PUR configuration is defined according to a set of PUR parameters based on transmissions in the RRC inactive state,
      receive, from the base station, via the transceiver, downlink control indicator (DCI) information for reconfiguring the PUR configuration in the RRC inactive state, and
      in response to a UL transmission failure, fall back to a random access channel (RACH) transmission mode, and receive, from the base station, via the transceiver, a message indicating the UE to change from the RACH transmission mode to a configured grant-based transmission mode,
   wherein the set of PUR parameters include at least one of a control resource set (CORESET) configuration including an aggregation level and repetition types; a physical UL shared channel (PUSCH) repetition configuration including a frequency hopping pattern; or a UL narrow beam direction for frequency range 2 (FR2) or a transmission reception point (TRP) association, and
   wherein the set of PUR parameters is associated with new radio (NR).

2. The UE of claim 1,
   wherein the CORESET configuration includes a UE-specific CORESET configuration or a common CORESET configuration to enable the UE to monitor and decode the DCI information for reconfiguring the PUR configuration in the RRC inactive state.

3. The UE of claim 1, wherein the processor is further configured to:
   receive, from the base station, via the transceiver, a PUR response message,
   wherein the PUR response message is UE-specific RRC signaling or a broadcast system information block, and
   wherein the PUR configuration is reconfigured with at least one of the PUR parameters based on the PUR response message.

4. The UE of claim 1, wherein the processor is further configured to:
receive, from the base station, via the transceiver, downlink control indicator (DCI) information,
wherein at least one of the PUR parameters is updated, activated, or deactivated, in the RRC inactive state, based on the DCI information.

5. The UE of claim 1, wherein the processor is further configured to:
in response to no UL data packets being transmitted for more than a predetermined number of continuous PUR transmissions, receive, from the base station, via the transceiver, a message indicating that the PUR configuration may be released.

6. The UE of claim 1, wherein the UL transmission failure is determined to occur based on at least one of a TA value, a low transmission power, deep channel fading, or a beam failure.

7. The UE of claim 1, wherein the processor is further configured to:
after the UE falls back to the RACH transmission mode, receive, from the base station, via the transceiver, a signal to reconfigure the UE to transmit a UL data packet, in the RRC inactive state, based on at least one of the PUR parameters.

8. The UE of claim 1, wherein at least one of the PUR parameters is reconfigured based on at least one of a UE request, a radio network load, or a radio link performance.

9. A base station apparatus for wireless communication with a user equipment (UE), the base station apparatus comprising:
a transceiver; and
a processor configured to:
receive, from the UE, via the transceiver, at least one uplink (UL) data packet in a radio resource control (RRC) inactive state based on a preconfigured UL resource (PUR) configuration, wherein the PUR configuration is defined according to a set of PUR parameters based on transmissions in the RRC inactive state,
transmit, to the UE, via the transceiver, downlink control indicator (DCI) information for reconfiguring the PUR configuration in the RRC inactive state, and
in response to a UL transmission failure, indicate the UE to fall back to a random access channel (RACH) transmission mode, and transmit, to the UE via the transceiver, a message indicating the UE to change from the RACH transmission mode to a configured grant-based transmission mode,
wherein the set of PUR parameters include at least one of a control resource set (CORESET) configuration including an aggregation level and repetition types; a physical UL shared channel (PUSCH) repetition configuration including a frequency hopping pattern; or a UL narrow beam direction for frequency range 2 (FR2) or a transmission reception point (TRP) association, and
wherein the set of PUR parameters is associated with new radio (NR).

10. The base station apparatus of claim 9, wherein the CORESET configuration includes a UE-specific CORESET configuration or a common CORESET configuration to enable the UE to monitor and decode the DCI information for reconfiguring the PUR configuration in the RRC inactive state.

11. The base station apparatus of claim 9, wherein the processor is further configured to:
transmit, to the UE, via the transceiver, a PUR response message,
wherein the PUR response message is UE-specific RRC signaling or a broadcast system information block, and
wherein the PUR configuration is reconfigured with at least one of the PUR parameters based on the PUR response message.

12. The base station apparatus of claim 9, wherein the processor is further configured to:
transmit, to the UE, via the transceiver, downlink control indicator (DCI) information,
wherein at least one of the PUR parameters is updated, activated, or deactivated, in the RRC inactive state, based on the DCI information.

13. The base station apparatus of claim 9, wherein the processor is further configured to:
in response to no UL data packets being received for more than a predetermined number of continuous PUR transmissions, transmit, to the UE, via the transceiver, a message indicating that the PUR configuration may be released.

14. The base station apparatus of claim 9, wherein the UL transmission failure is determined to occur based on at least one of a TA value, a low transmission power, deep channel fading, or a beam failure.

15. The base station apparatus of claim 9, wherein the processor is further configured to:
after the UE falls back to the RACH transmission mode, transmit, to the UE, via the transceiver, a signal to reconfigure the UE to transmit a UL data packet, in the RRC inactive state, based on at least one of the PUR parameters.

16. The base station apparatus of claim 9, wherein at least one of the PUR parameters is reconfigured based on at least one of a UE request, a radio network load, or a radio link performance.

17. A base station apparatus for wireless communication with a user equipment (UE), the base station apparatus comprising:
a transceiver; and
a processor configured to:
transmit, to the UE, via the transceiver, signaling information to reconfigure a preconfigured uplink (UL) resource (PUR) for receiving at least one UL data packet from the UE in a radio resource control (RRC) inactive state, wherein the PUR reconfiguration is defined according to a set of PUR parameters based on transmissions in the RRC inactive state,
transmit, to the UE, via the transceiver, downlink control indicator (DCI) information for reconfiguring the PUR reconfiguration in the RRC inactive state, and
in response to a UL transmission failure, indicate the UE to fall back to a random access channel (RACH) transmission mode, and transmit, to the UE, via the transceiver, a message indicating the UE to change from the RACH transmission mode to a configured grant-based transmission mode,
wherein the set of PUR parameters include at least one of:
a resource allocation in a frequency, time or spatial domain,
a control resource set (CORESET) configuration including an aggregation level and repetition types,
a physical UL shared channel (PUSCH) repetition configuration including a frequency hopping pattern, a periodicity of the PUR,
a modulation and coding scheme (MCS),
a transport block size (TBS),
a UL narrow beam direction for frequency range 2 (FR2)
  or a transmission reception point (TRP) association,
an activation or deactivation of the PUR,
a transmission power (Tx) adjustment, or
a time alignment (TA), and
wherein the set of PUR parameters is associated with new
  radio (NR).

\* \* \* \* \*